United States Patent
Agarwal et al.

(10) Patent No.: US 6,740,276 B2
(45) Date of Patent: May 25, 2004

(54) PROCESS FOR PREPARING PIGMENTED SHAPED ARTICLES COMPRISING POLY (TRIMETHYLENE TEREPHTHALATE)

(75) Inventors: Nirmal K. Agarwal, Seaford, DE (US); Jing C. Chang, Boothwyn, PA (US); Richard Lee Dommel, Lugoff, SC (US); Joseph V. Kurian, Hockessin, DE (US); Raymond Longhi, Chattanooga, TN (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 348 days.

(21) Appl. No.: 09/895,906

(22) Filed: Jun. 29, 2001

(65) Prior Publication Data

US 2003/0045611 A1 Mar. 6, 2003

(51) Int. Cl.[7] .......................... D02G 3/02; B29C 47/12; D01H 4/00; C08J 3/22
(52) U.S. Cl. .............. 264/177.13; 264/173.1; 264/175; 57/2; 57/310; 523/351; 523/353; 428/365; 428/395
(58) Field of Search ................. 428/365, 395; 523/351, 353; 264/177.13, 173.1, 175; 57/2, 310

(56) References Cited

U.S. PATENT DOCUMENTS

| | | | |
|---|---|---|---|
| 3,350,871 A | 11/1967 | Pierce et al. | |
| 3,525,134 A | 8/1970 | Coon | |
| 3,671,379 A | 6/1972 | Evans et al. | |
| 4,295,252 A | 10/1981 | Robinson et al. | |
| 5,340,909 A | 8/1994 | Doerr et al. | |
| 5,645,782 A | 7/1997 | Howell et al. | |
| 5,662,980 A | 9/1997 | Howell et al. | |
| 5,756,020 A | 5/1998 | Locke et al. | |
| 5,872,204 A | 2/1999 | Kuo et al. | |
| 5,989,665 A | 11/1999 | Connell et al. | |
| 6,109,015 A | 8/2000 | Roark et al. | |
| 6,113,825 A | 9/2000 | Chuah | |
| 6,231,958 B1 | 5/2001 | Kim et al. | |
| 6,482,484 B1 | 11/2002 | Brown et al. | |
| 6,482,511 B1 * | 11/2002 | Martinez Antonio | 428/364 |
| 6,497,950 B1 * | 12/2002 | Haile et al. | 428/364 |
| 2002/0025433 A1 | 2/2002 | Chang et al. | |

FOREIGN PATENT DOCUMENTS

| | | |
|---|---|---|
| EP | 0 949 363 A2 | 10/1999 |
| EP | 1 016 692 A1 | 7/2000 |
| EP | 1 016 741 A1 | 7/2000 |
| GB | 1075689 | 7/1967 |
| WO | 1993262862 A | 10/1993 |
| WO | WO 2000-26301 | 5/2000 |

OTHER PUBLICATIONS

Derwent and Japio English Abstracts: JP 52-071432; Application Date: Dec. 9, 1975 Teijin Ltd.

* cited by examiner

*Primary Examiner*—Tae H. Yoon
(74) *Attorney, Agent, or Firm*—Mark D. Kuller

(57) ABSTRACT

A process of making a pigmented shaped article comprising: (a) providing polytrimethylene terephthalate chips and two or more colored pigmented chips each containing at least one different color pigment; (b) heating the polytrimethylene terephthalate chips and colored pigmented chips to a temperature of about 200–about 280° C. to melt the chips and form a polymer composition comprising the polytrimethylene terephthalate and at least one color pigment; and (c) forming a shaped article from the polymer composition.

21 Claims, 1 Drawing Sheet

PROCESS FOR PREPARING PIGMENTED SHAPED ARTICLES COMPRISING POLY (TRIMETHYLENE TEREPHTHALATE)

The invention relates to a process for preparation of pigmented shaped articles (e.g., fibers).

Traditionally, fibers have been chemically dyed at the mills. Residual chemicals after the dyeing operations are costly to dispose of and chemical dyeing is expensive. Pigmented or producer colored fibers can be used to avoid the expense of chemically dyeing the fibers, and generally have better characteristics than dyed fibers, including color depth, resistance to fading and bleach resistance.

A number of techniques have been used for introducing color pigments into fibers. For instance, $TiO_2$ and color pigments may be added to a polyester manufacturing process. EP 1 016 692 and EP 1 016 741 (both incorporated herein by reference) describe use of East Bright (Eastman) and Hostaperm® pigment (Trademark of Hoechst Aktiengesellschaft), referring to Japanese Unexamined Patent Publication 5-262862, which corresponds to U.S. Pat. No. 5,340,909. U.S. Pat. No. 5,340,909 (incorporated herein by reference) describes preparing poly(1,3-propylene terephthalate) using Hostaperm pigments. These pigments are added before polycondensation and preferably with the initial terephthalic acid or lower dialkyl ester of terephthalic acid charge of raw materials. The resultant polyester is disclosed to be useful in making monofilaments. WO 00/26301 (incorporated herein by reference) teaches preparing a polyester resin composition comprising polytrimethylene terephthalate and $TiO_2$. The composition is stated to be useful in spinning fibers. U.S. Pat. No. 5,872,204 (incorporated herein by reference) describes preparing polytrimethylene terephthalate flakes using pigment and spinning filament from the flakes. U.S. Pat. Nos. 3,350,871 and 3,671,379 and UK Patent Specification No. 1,075,689 (all incorporated herein by reference), Example 1, show preparation of polytrimethylene terephthalate using a catalyst prepared by dissolving 2.5 grams of sodium in 300 ml of n-butanol, adding 37 grams of tetrabutyl titanate, and diluting to 500 ml with n-butanol. Titanium dioxide is added as a delusterant. This polyester is disclosed to be useful in making bicomponent fibers.

To polymerize polymer with various color pigments is inflexible, impractical and uneconomical since typical polymer production is large scale and transition from one color to another would take days of lost production. Therefore, it is most advantageous to add color pigments into the fiber during the spinning process where color transition is short, and small lots color production is desirable and feasible.

Pigmented fibers offer no more chemical dyeing, high amount of color offerings, low cost colored fibers and most economic production. Thus, it is common for colorants to be added to a masterbatch, wherein all the pigments, dyes, or combinations thereof are added in a concentrated form to a polymer, and this polymer is mixed with the polymer to be colored. Usually masterbatches in pellet form are introduced to an extruder through a gravimetric feeder. Masterbatches have several disadvantages. It is difficult to adjust the color of the articles being extruded if the color is off aim without completely reformulating the masterbatch, and a separate masterbatch is required for each desired color.

U.S. Pat. No. 6,109,015, and its counterpart EP 0 949 363 (published Oct. 13, 1999) (both incorporated herein by reference), teach preparing polytrimethylene terephthalate yarn from chips, wherein the chips and any additives are added to a melt extrusion system wherein the input is melted, mixed, homogenized and extruded through a spinneret into filaments. Example 4 describes adding a carbon black dispersion and a titanium dioxide dispersion into the polytrimethylene terephthalate. Example 7 states that a white pigment was dispersed in a PA6 carrier to form a masterbatch concentrate and then was dispersed in the polytrimethylene terephthalate. Example 8 is directed to a bronze-colored solution-dyed yarn and states that "[t]he pigments in the formulated bronze color were predispersed in PA6 carrier prior to producing the compound for spinning." Example 9 describes preparing a black-solution dyed yarn in a similar manner to Example 7 with pigments predispersed in PA6. Example 10 describes preparing a blue solution-dyed yarn with pigment predispersed in polytrimethylene terephthalate. Example 14 describes preparing an off-white formulated color concentrate with a polytrimethylene terephthalate carrier. Yarn and carpets were produced. The disclosed processes have the disadvantages described above.

Locke et al., in U.S. Pat. No. 5,756,020 (incorporated herein by reference), teach a process for introducing colorants (pigments and/or dyes) into thermoplastic polymers, such as nylon, polypropylene, polyester and copolymers and blend thereof, wherein colorants are fed from gravimetric feeders into an extruder containing the polymer. This patent discloses the advantage of having one colorant in each feeder so that color may be controlled by the rate each colorant is fed to the extruder. One major problem found is that typical polyester, polypropylene and polyamide producer colored fiber production requires the use of carefully selected pigments and associated carriers that can survive high remelt and transport temperatures without changing their desired properties due to thermal degradation. The pigments and carriers have a negative impact on the subsequent spinning process by significantly increasing the draw tension and draw tension variability, and causing breakouts and total breakdowns, thereby reducing productivity. Some polymers required for pigment processing are incompatible with the base polymer causing further reduced productivity and fiber performance. In addition, some color pigments required for certain critical colors in the high temperature processes are highly abrasive and can damage critical yarn contact surfaces both on the spinning machine and in customers processing operations.

None of the processes described above present a satisfactory way of preparing a pigmented fiber. A satisfactory process of pigmenting fibers that enables use of more heat sensitive pigments, permits relatively easy control of color at the fiber manufacturing facility, and results in good pigment dispersion, enhanced spin performance (e.g., reduced fiber breaks and improved yields) and increased color offerings (e.g., use of a wider variety of pigments and control of color and uniformity) has been needed.

SUMMARY OF THE INVENTION

This invention is directed to a process of making a pigmented shaped article comprising: (a) providing polytrimethylene terephthalate chips and two or more colored pigmented chips each containing at least one different color pigment; (b) heating the polytrimethylene terephthalate chips and colored pigmented chips to a temperature of about 200–about 280° C. to melt the chips and form a polymer composition comprising the polytrimethylene terephthalate and at least one color pigment; and (c) forming a shaped article from the polymer composition.

The chips are preferably heated to about 245–about 270° C.

The spinning is preferably carried out using a spinneret at a polymer temperature of about 235–about 275° C.

The colored pigmented chips preferably comprise polytrimethylene terephthalate and at least one color pigment.

In one embodiment, preferably at least some of the polytrimethylene terephthalate chips contain $TiO_2$. In that embodiment, or in another preferred embodiment, preferably at least some of the colored pigmented chips contain $TiO_2$.

In another preferred embodiment, the colored pigmented chips do not contain $TiO_2$.

In some embodiments, the color pigment is preferably a color pigment other than carbon black.

In a preferred embodiment, the polytrimethylene terephthalate chips and polytrimethylene terephthalate pigmented chips are fed to a remelter, melted and mixed in the remelter and formed into a shaped article through an extruder.

Preferably, the polytrimethylene terephthalate and the color pigment form a substantially uniform melt in the remelter.

Preferably, the forming a shaped article comprises extruding the polymer composition through a spinneret so as to form fibers.

In one embodiment, the fibers are formed into a yarn. A preferred yarn is a BCF yarn.

Preferably, the polytrimethylene terephthalate chips comprise at least 70 weight % or more, by weight of the polytrimethylene terephthalate chips, of polytrimethylene terephthalate.

Preferably, the colored pigmented chips comprise about 30–about 99.9 weight % polytrimethylene terephthalate and about 0.1–about 70 weight % color pigment, both by weight of the colored pigmented chips. Preferably, the colored pigmented chips consist essentially of (a) polytrimethylene terephthalate(s), (b) about 0.1–about 70 weight % color pigment(s), (c) optionally $TiO_2$, and (d) optionally one or more chip additive.

Preferably, at least two of the two or more colored pigmented chips, and more preferably each of the two or more colored pigmented chips, are fed from separate containers.

In some embodiments, the shaped article is preferably a monocomponent filament.

In some embodiments, the shaped article is preferably a staple fiber.

In some embodiments, the shaped article is preferably a bicomponent fiber comprising polytrimethylene terephthalate in at least one component.

In another preferred embodiment, the shaped article is a film or a layer of a film.

The final polymer or shaped article is preferably at least about 0.01, more preferably at least about 0.05% total color pigment, and up to about 10% total color pigment, more preferably, up to about 5%, by weight of the polymer or shaped article.

DETAILED DESCRIPTION OF THE INVENTION

Figure 1:
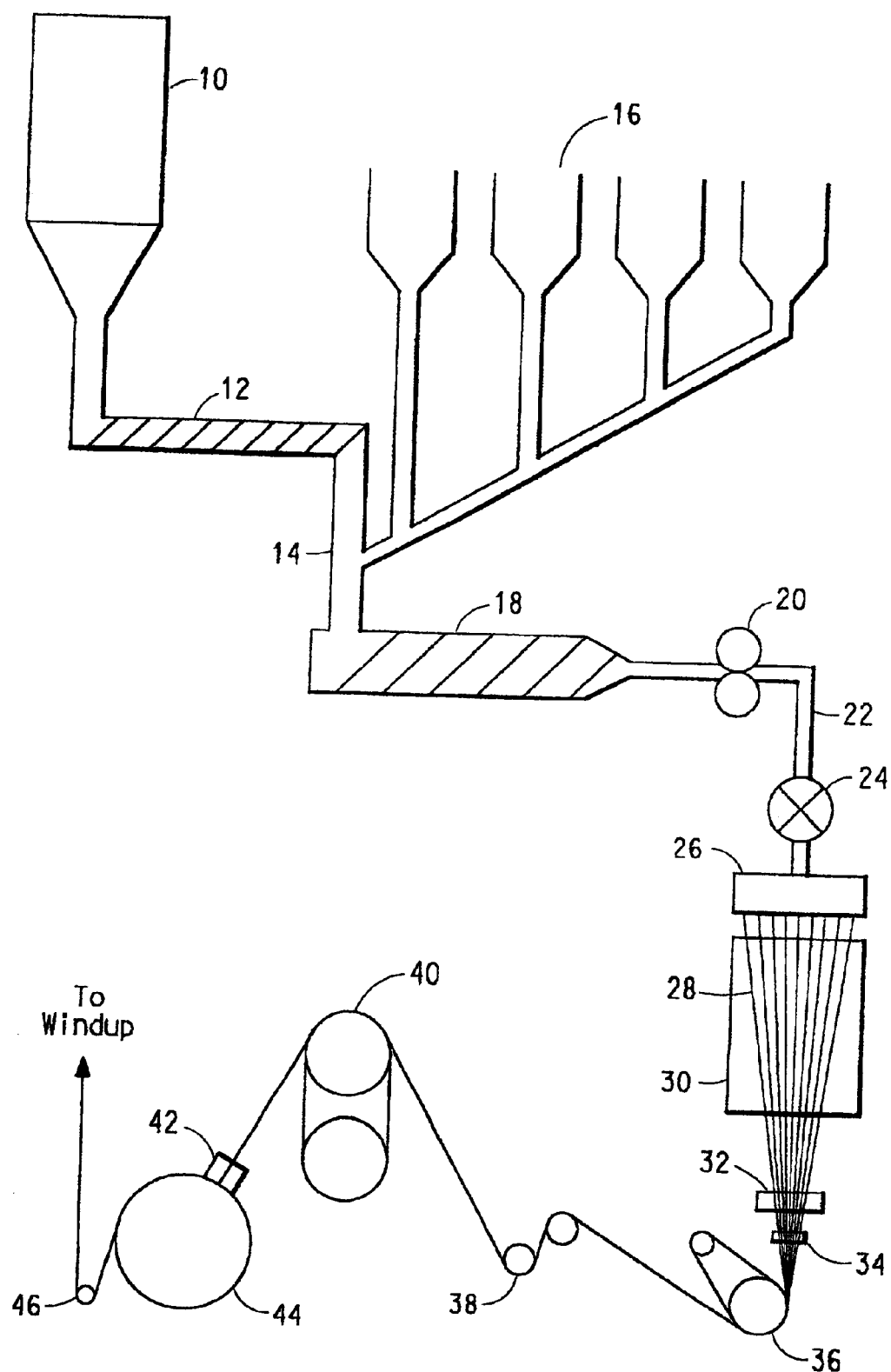
FIG. 1 is a schematic diagram showing how this invention can be practiced, where color pigment is incorporated into polytrimethylene terephthalate, the resultant colored pigmented polytrimethylene terephthalate chips are mixed with polytrimethylene terephthalate chips, the chips are melted at low temperature, and the resultant composition is spun into fibers.

The invention relates to a process for preparation of pigmented polytrimethylene terephthalate shaped articles, such as fibers and films. The process allows the use of a larger range and variety of color pigments, and associated pigment carriers, and enables the practioner to provide a wide range of color offerings.

Polytrimethylene terephthalates useful in this invention are well known. By "polytrimethylene terephthalate", reference is made to compositions comprising polytrimethylene terephthalate homopolymer and copolymers, by themselves or in blends.

The polytrimethylene terephthalate of the invention preferably contains about 70 mole % or more of polytrimethylene terephthalate. It may be copolymerized with up to 30 mole % of polyester repeat units made from other diols or diacids. The other diacids include isophthalic acid, 1,4-cyclohexane dicarboxylic acid, 2,6-naphthalene dicarboxylic acid, 1,3-cyclohexane dicarboxylic acid, succinic acid, glutaric acid, adipic acid, sebacic acid, 1,12-dodecane dioic acid, and the derivatives thereof such as the dimethyl, diethyl, or dipropyl esters of these dicarboxylic acids. The other diols include ethylene glycol, 1,4-butane diol, 1,2-propanediol, diethylene glycol, triethylene glycol, 1,3-butane diol, 1,5-pentane diol, 1,6-hexane diol, 1,2-, 1,3- and 1,4-cyclohexane dimethanol, and the longer chain diols and polyols made by the reaction product of diols or polyols with alkylene oxides. Polymers useful in this invention also include polymeric compositions and copolymers comprising functional additive(s) or monomer(s). The polytrimethylene terephthalate of the invention more preferably contains more than 70 mole % polytrimethylene terephthalate, i.e., more preferably at least 80, 90, 95 and 99 mole %. The most preferred polymer is polytrimethylene terephthalate homopolymer.

The polytrimethylene terephthalate of the invention may be blended with other polymers such as polyethylene terephthalate, nylon 6, nylon 6,6, polybutylene terephthalate, etc., and preferably contains 70 mole % or more polytrimethylene terephthalate, more preferably at least 80, 90, 95 and 99 mole % polytrimethylene terephthalate. Most preferred is use of polytrimethylene terephthalate without such other polymers.

Polytrimethylene terephthalate has an intrinsic viscosity that typically is about 0.2 deciliters/gram (dl/g) or higher, and typically is about 2 dl/g or less. For fiber use, the polytrimethylene terephthalate preferably has an intrinsic viscosity that is about 0.6 dl/g or higher, and typically is about 1.5 dl/g or less. Preferred viscosities for many end uses, and, particularly for fibers and films, are 0.8 dl/g or higher, more preferably 0.9 dl/g or higher. Typically, the-viscosity of polytrimethylene terephthalate fibers and films is 1.4 dl/g or less, 1.2 dl/g or less, or 1.1 dl/g or less. Polytrimethylene terephthalate homopolymers particularly useful in practicing this invention have a melting point of approximately 225–231° C.

Polytrimethylene terephthalate useful in this invention may be produced by known manufacturing techniques (batch, continuous, etc.), such as described in U.S. Pat. Nos. 5,015,789, 5,276,201, 5,284,979, 5,334,778, 5,364,984, 5,364,987, 5,391,263, 5,434,239, 5,510454, 5,504,122, 5,532,333, 5,532,404, 5,540,868, 5,633,018, 5,633,362, 5,677,415, 5,686,276, 5,710,315, 5,714,262, 5,730,913, 5,763,104, 5,774,074, 5,786,443, 5,811,496, 5,821,092, 5,830,982, 5,840,957, 5,856,423, 5,962,745 and 5,990265, EP 998 440, WO 00/14041 and 98/57913, H. L. Traub, "Synthese und textilchemische Eigenschaften des Poly-Trimethyleneterephthalats", Dissertation Universitat Stuttgart (1994), S. Schauhoff, "New Developments in the Production of Polytrimethylene Terephthalate (PTT)", Man-Made Fiber Year Book (September 1996), and U.S. patent application Ser. Nos. 09/016,444, 09/273,288, 09/291,960, 09/346,148, 09/382,970, 09/382,998, 09/500,340, 09/501,700, 09/502,322, 09/502,642, 09/503,599, 09/505,785, 09/644,005, 09/644,007 and 09/644,008, all of which are incorporated herein by reference. Polytrimethylene terephthalates useful as the polyester of this invention are commercially available from E. I. du Pont de Nemours and Company, Wilmington, Del. under the trademark "Sorona".

By "polytrimethylene terephthalate chips" reference is made to chips made of polytrimethylene terephthalate, including the aforementioned copolymers and blends. (See the above preferences.) Chips may contain additives such as antioxidants, residual catalyst, delusterants (e.g., $TiO_2$, zinc sulfide or zinc oxide), colorants (e.g., dyes), stabilizers, flame retardants, fillers (such as calcium carbonate), antimicrobial agents, antistatic agents, optical brightners, extenders, processing aids and other functional additives, hereinafter referred to as "chip additives". When used, $TiO_2$ or similar compounds (e.g., zinc sulfide and zinc oxide) are used as pigments or delusterants in amounts normally used in making polytrimethylene terephthalate, that is up to about 5 weight % or more in making fibers and larger amounts in some other end uses. When used in polymer for fibers and films, $TiO_2$ is added in an amount of preferably at least about 0.01 weight %, more preferably at least about 0.02 weight %, and preferably up to about 5% weight %, more preferably up to about 3 weight %, and most preferably up to about 2 weight %, by weight of the polymers, fibers or films.

Herein, "chips" is used broadly is intended to include pellets, flakes and the like, of varying sizes and shape. Commercial Sorona™ poly(trimethylene terephthalate) products for making fibers are typically cylindrical pellets, which are approximately 3 mm/3 mm/4 mm.

By "pigment" reference is made to those substances commonly referred to as pigments in the art. Pigments are substances, usually in the form of a dry powder, that impart color to the polymer or article (e.g., chip or fiber). Pigments can be inorganic or organic, and can be natural or synthetic. Generally, pigments are inert (e.g., electronically neutral and do not react with the polymer) and are insoluble or relatively insoluble in the medium to which they are added, in this case the polytrimethylene terephthalate composition. In some instances they can be soluble.

By "colored pigmented chips" reference is made to a chips comprising carrier and at least one pigment other than $TiO_2$, which may optionally contain other processing aids, such as binder, dispersing agents, $TiO_2$, etc. For simplicity, pigments other than $TiO_2$ will be referred to herein as "colored pigment(s)". Colored pigmented chips contain about 0.1 to about 70 or more weight % color pigment (typically up to about 35 or 40 weight %), depending on the color pigment and desired product. The carrier may be polyethylene terephthalate, polytrimethylene terephthalate, polybutylene terephthalate and copolyesters thereof, nylon 6, nylon 6,6, polypropylene, polyethylene or any other suitable polymer, provided that the carrier is compatible with the polytrimethylene terephthalate being used. The preferred carriers have a melting point close to that of the polytrimethylene terephthalate homopolymer or copolymer being used. That is, for best results the melting point of the carrier should not be significantly higher than that of the melting point of the polytrimethylene terephthalate homopolymer or copolymer and should be sufficiently low so that the desired colored pigment(s) can be used. Thus, the melting point is preferably no more than about 20° C. higher than that of the polytrimethylene terephthalate homopolymer or copolymer being used, and more preferably should be no more than about 10° C. higher, most preferably no more than about 5° C. higher. The melting point may be lower than that that of the polytrimethylene terephthalate homopolymer or copolymer, so long as fibers may be spun under suitable conditions. The melting point preferably will be no more than about 20° C. lower than that of the polytrimethylene terephthalate homopolymer or copolymer being used, and preferably should be no more than about 10° C. lower, more preferably no more than about 5° C. lower. The preferred carrier is polytrimethylene terephthalate and reference to colored pigmented chips with this carrier will be to "polytrimethylene terephthalate colored pigmented chips". The colored pigmented chips may contain one or more chip additives. (See the preferences indicated above.)

When using carriers other than polytrimethylene terephthalate, it may be necessary to use a polymer that is not well suited for making fibers so that the fiber has a melting point similar to that of polytrimethylene terephthalate. Thus, for instance, a polyethylene terephthalate having a lower melting point, that would not normally be suitable for preparing fibers, might be used as a carrier. The fact that the carrier polymer is not fiber grade will not normally be problematic since it is used in much smaller amounts than the polytrimethylene terephthalate.

By "colored pigment", reference is made to pigments useful in polymers, fibers, films and other shaped articles, including products made therewith, other than $TiO_2$. ($TiO_2$ can be added in the same manner and can also be present.) This invention is useful with many types of color pigments. The most important benefits are achieved in "color" pigments. The invention can be used to add carbon black, where desired. However, it is preferably used to make fibers with colors such as blue, purple, red, yellow, orange, green, brown, pink, etc. The ability to control color, particularly using heat sensitive color pigments that cannot be used in other systems is a major advantage of this invention.

It is should also be understood that this invention provides advantages with all color pigments (such as carbon black) that do not perform well at higher temperatures used in the making of other types of fibers.

The compositions of this invention are useful in fibers, fabrics, films and other useful articles, and methods of making such compositions and articles. The process of this invention is advantageous for producing continuous and cut (e.g., staple) fibers, yarns, and knitted, woven and nonwoven textiles. The fibers may be monocomponent fibers or multicomponent (e.g., bicomponent) fibers, and may have many different shapes and forms. They are useful for textiles and flooring. One preferred embodiment is directed to making pigmented bulked continuous filament ("BCF") yarns. The pigmented polytrimethylene terephthalate compositions may form a film or a film layer, etc.

Bulked continuous filament yarns and fabrics are preferably manufactured according to the process described in U.S. Pat. Nos. 5,645,782 and 5,662,980 (which are incorporated herein by reference), as modified to use the features of this invention. They may also be manufactured as described in U.S. Pat. Nos. 6,109,015 and 6,113,825 (which are incorporated herein by reference), as modified to use the features of this invention. Other documents describing fibers and fabrics, and their manufacture, include U.S. Pat. Nos. 5,885,909 and 5,782,935, WO 99/06399, 99/27168, 99/39041,00/22210, 00/26301, 00/29653, 00/29654, 00/39374 and 00/47507, EP 745 711, 1 016 741, 1 016 692, 1 006 220 and 1 033 422, British Patent Specification No. 1 254 826, JP 11-100721, 11-107036, 11-107038, 11-107081, 11-189920, and 11-189938, U.S. patent application Ser. Nos. 09/518,732, 09/795,518 and 09/795,520 and H. L. Traub, "Synthese und textilchemische Eigenschaften des Poly-Trimethyleneterephthalats", Dissertation Universitat Stuttgart (1994), H. L. Traub "Dyeing properties of Polytrimethylene terephthalate fibres", Melliand (1995), H. L. Traub et al., "Mechanical Properties of fibers made of polytrimethylene terephthalate", Chemical Fibers International (CFI) Vol. 45, 110–111 (1995), W. Oppermann et al. "Fibers Made of Polytnrmethylene terephthalate", Dombim (1995), H. S. Brown, H. H. Chuah, "Texturing of Textile Filament Yarns Based on Polytrimethylene terephthalate", Chemical Fibers International, 47:1, 1997. pp. 72–74, S. Schauhoff, "New Developments in the Production of Polytrimethylene Terephthalate (PTT)", Man-Made Fiber Year Book (September 1996), all of which are incorporated herein by reference.

Multicomponent fibers, for example, bicomponent fibers comprising poly(ethylene terephthalate) and polytrimethylene terephthalate, poly(ethylene terephthalate) and poly(tetramethylene terephthalate) or two different polytrimethylene terephthalates may contain color pigment in one or both components. The components can be arranged in a sheath-core, eccentric sheath-core, or side-by-side relationship. When it is desired that the bicomponent fiber be crimpable on drawing, heat-treating, and relaxing to form a stretchable fiber, an eccentric sheath-core or side-by-side relationship can be used; side-by-side is preferred for higher crimp levels. The preferred polyethylene terephthalate/polytrimethylene terephthalate bicomponent fibers can be manufactured as described in copending U.S. patent application Ser. Nos. 09/758,309, which is incorporated herein by reference.

U.S. Pat. No. 5,756,020 Locke (which is incorporated herein by reference) teaches steps and apparatus that can be used in practicing this invention. However, it is preferred to use feeder 16 (see FIG. 1 and the following description) instead of Locke's transfer tube 10.

Specific aspects preferred for use with this invention are described below with reference to FIG. 1.

FIG. 1 illustrates one method for manufacturing pigmented bulked continuous filaments of polytrimethylene terephthalate. Polytrimethylene terephthalate chips are loaded into the dryer 10 and dried. Drying is preferably carried out at about 80° C. or higher and about 180° C. or lower, most preferably about 160° C. The polytrimethylene terephthalate chips are preferably dried until the moisture content is about 500 ppm or less, more preferably about 100 ppm or less, and most preferably about 50 ppm or less. The operator should keep the moisture level steady in order to maintain consistent melt viscosity. Commercially available dehumidifiers can be used. Dry nitrogen, air or other inert gasses can be used.

The dried chips are fed to optional chip metering screw 12 and are metered in to the remelter throat 14. At this location 14, the colored pigmented chips are metered from the colored pigmented chip supply vessels 16 and are combined with the polytrimethylene terephthalate chips as the total chip mixture drops into the remelter 18 throat or entry location.

It is not necessary to dry the colored pigmented chips, provided they are kept dry following preparation. For instance they can be packaged in hermetically sealed bags and stored in a hopper containing dry nitrogen, air or other inert gasses.

The metering screw is optional since the screw can be used to control the amount of chips used. A chip metering screw is normally used with a screw remelter. Any commercially available metering screw can be used. As an alternative, one can blend the chips and colored pigmented chips and then add them to the remelter.

By "remelter throat" reference is being made to a pipe connecting the metering screw and the remelter.

While FIG. 1 shows four supply vessels for providing colored pigmented chips, it should be readily recognized that one or more vessels may be used depending on the design of the facility, pigmenting desired, and types and varieties of fibers being made, etc. Preferred are systems with two, three, four, five, six or more supply vessels.

Any supply vessel suitable for these types of applications can be used.

The chips mixture is transported and melted in the remelter 18.

The remelter can be any suitable single or twin screw extruder.

Remelting is preferably carried out at about 200° C. or higher, preferably at least about 235° C., more preferably at least about 245° C., and at about 280° C. or lower, preferably about 270° C. or lower, more preferably about 265° C. or lower.

Polymer is fed to optional transfer line pump 20, which provides sufficient pressure (~2250–3000 psig) to overcome losses in the transfer line 22, provides constant feed rate, and provides sufficient pressure to feed the polymer to the spin pack metering pump 24. Any suitable pump may be used.

The metering pump 24 meters the polymer composition to the spin pack 26 where the polymer is extruded through a spinneret or die to form filaments 28 which are pulled by metering roll 36 through quench chimney 30 where the filaments are cooled by a radial flow or cross flow of gas. Prior to the meter roll 36, a spin finish or oil is applied to the solidified filaments by finish applicator 32. Following the finish application and prior to the meter roll the filaments are treated with turbulent air in the optional preintermingling device 34 to even out the finish on the filaments.

For all fibers and in particular polytrimethylene terephthalate monofilament fibers, and polyethylene terephthalate/polytrimethylene terephthalate side-by-side or sheath/core bicomponent fibers, the polymer is extruded through the spinneret or die at a temperature of at least about 200° C., preferably at least about 235° C., more preferably at least about 245° C., and up to about 275° C., preferably up to about 270° C., more preferably up to about 265° C.

The spin pack metering pump and spin pack may be heated through conventional means (e.g., Dow fluid or hot oil).

The throughput is a function the number of spin positions and typically is anywhere from about 2 pounds/hour (about 0.9 kg/hour) to commercial scales of about 2,000 pounds/hour (about 907 kg/hour) to about 3,000 pounds/hour (about 1,361 kg/hour) per spinning machine (i.e., per one remelter).

The quench chimney cools the filaments by a radial flow or cross flow of gas, typically humidified air at a temperature preferably about 10° C. or above and preferably about 30° C. or below applied at about 0.2 m/sec or more and about 0.8 m/sec or less.

The meter roll 36 is optionally heated to warm the filaments. The filaments are led to heated drawpins 38. The filaments are drawn between the drawpins 38 and the heated draw rolls 40.

The heated draw pins are maintained at a temperature no greater that about 150° C.

A preferred embodiment is to bypass the drawpins 38 and control the drawing process using the heated meter roll 36. Preferably, in this embodiment the heater meter roll is heated to a temperature so that the fibers are at a uniform temperature in the range of about 35–about 65° C.

The filaments are drawn and then pass onto the heated draw rolls 40. The draw rolls are preferably maintained at temperature of about 80° C. or more, and about 200° C. or less, to promote annealing. The temperature is preferably at least about 120° C. to heat the yarn in preparation for bulking. Heating the yarn above about 200° C. may cause it to melt onto the draw rolls. The draw ratio of the filaments is controlled by adjusting the speeds of the metering roll and/or draw rolls until the break elongation of the filaments is preferably at least about 10%, more preferably at least 20% and preferably no more than about 90%, more preferably no more than 70%. This typically corresponds to a draw ratio preferably of at least about 1.1, preferably at least about 1.5, and preferably no more than about 5. The draw may be in one stage or in multiple stages.

The draw rolls 40 deliver the filaments to a jet-bulking unit 42 where the filaments are blown and deformed in three directions with hot bulking fluid such as air or steam. A unit suitable for carrying out the invention is described in U.S. Pat. No. 3,525,134, the disclosure of which is hereby incorporated herein by reference. The hot fluid must be at a temperature of at least that of the draw rolls 40, preferably between 120 to 225° C.

In the bulking unit described in U.S. Pat. No. 3,525,134, the filaments are both bulked and entangled. When other bulking units are used, a separate entangling step may be necessary prior to the windup. Any method common in the trade may be used to entangle the yarn.

The resultant BCF yarn, having randomly spaced 3-dimensional curvilinear crimp, is then preferably cooled below the glass transition temperature of the filaments (approximately 45–50° C.) while the yarn is in a state of approximately 0 gpd tension so as not to pull out a significant amount of crimp. Cooling may be accomplished by a variety of commercially available means, preferably by air or water flow, spray or mist.

In a preferred embodiment, the BCF yarn is ejected from bulking unit 42 (such as bulking jet or stuffer jet) and deposited onto a rotating drum 44, preferably having a perforated surface through which air is suctioned (preferably at about 1–30 inch vacuum, most preferably about 10 inches). Yarns then pass over change of direction roll 46 and are wound up at a speed of preferably at least about 6%, and preferably less than about 20%, most preferably about 10%, less than that of the draw rolls. The windup speed is kept at least about 10% less than that of the draw rolls because running at a higher speed would cause crimp development to decrease and yarn shrinkage to increase.

In commercial applications, the spinning speed is preferably at least about 1,000 meters/minute, and may be up to about 5,000 meters/minute or more, using roll 40 as reference speed.

Combining the spinning, drawing and texturing steps into a single process as described in the preceding description offers high productivity and gives a uniform, reproducible yarn. These steps may also be carried out using a split process (e.g., separate yarn and bulk processes).

The preferred pigmented BCF yarns of this invention have an intrinsic viscosity preferably of about 0.6 or more and preferably of less than about 1.3, a bulk crimp elongation (BCE) preferably of at least about 20% and preferably no more than about 95%, a denier per filament preferably of at least about 0.4, more preferably at least about 12, and preferably up to about 45, more preferably up to about 19, and a total yarn denier preferably of about 20 or more and preferably about 5,000 or less. Tenacity is preferably at least about 1.2 grams per denier (gpd) and preferably as high as about 4 gpd, and break elongation is preferably at least about 10%, and runs as high as about 90%, more preferably at least about 20% and about 70% or less. Although these BCF yarns are particularly useful in carpets, their end uses also include upholstery and wall covering.

By carrying out the process at low temperatures negative impact of the color pigments and pigment carriers on the subsequent spinning process is reduced, resulting in increased productivity, enhanced fiber properties, relatively easy control of color at the fiber manufacturing facility, better pigment dispersion and increased color offerings.

One advantage of the invention is the use of low temperatures in the polymer remelter and transport system. Polytrimethylene terephthalate has a melting point of approximately 225–231° C. Low temperature processes were established that minimized hydrolysis of the base polytrimethylene terephthalate polymer and minimized the degradation of the color pigments and pigment carriers.

A second feature of one preferred embodiment of this invention is the incorporation of polytrimethylene terephthalate as the pigment carrier to provide a single-phase polymer melt. This embodiment enables use of a broad range of color pigments, particularly those that are degraded when prepared with higher temperature carriers.

A third feature of the invention is the broader range of color pigments and pigments types (organic and inorganic) can be used provide unique color offerings.

A fourth feature of this invention is that the resultant pigmented polytrimethylene terephthalate fibers are equal to or superior to nylon 6,6 fibers in colorfastness tests. The ability to select color pigments primarily for the desired color and end use performance, rather than the effect on spinning performance, provides a superior fiber offering. Here, it should be pointed out that $TiO_2$ is relatively easy to incorporate in polytrimethylene terephthalate, nylon 6, and nylon 6,6, whereas incorporating silicates, sulfates, carbonates (e.g., carbon black) and other color pigments into nylon 6, and nylon 6,6 is relatively difficult.

While not intending to be limited, it is believed that the benefits achieved with this invention are in part due to the unexpected crystallization behavior of the pigmented polytrimethylene terephthalate. Polytrimethylene terephthalate is slower to crystallize than nylon 6 and nylon 6,6. When color pigmented, nylon 6,6 sometimes doesn't have much different performance (than unpigmented nylon 6,6), but often it crystallizes too fast and fiber breaks occur. Nylon 6 normally crystallizes slower than nylon 6,6; however, crystallization and fiber breaks still occur, but not to the same extent as nylon 6,6. There is little experience with pigmenting polyesters, such as polyethylene terephthalate and polypropylene terephthalate, since they have not been very useful for BCF yarn applications, such as carpet, and since polyethylene terephthalate melts at too high a temperature for use with most pigments. Therefore, it was unexpected that addition of a wide variety of color pigments to polytrimethylene terephthalate did not significantly negative impact the crystallization rate of 3 GT.

Another feature of this invention is that polytrimethylene terephthalate is attractive for many end uses, such as BCF yarns, where polyethylene and polybutylene terephthalates are not attractive, and the ability to provide colored pigmented fibers for these end uses is important.

TEST METHODS: The following test methods were used in carrying out the examples and are appropriate for measuring the values provided above.

The intrinsic viscosity (IV) was determined using viscosity measured with a Viscotek Forced Flow Viscometer Y900 (Viscotek Corporation, Houston, Tex. for the polyester dissolved in 50/50 weight % trifluoroacetic acid/methylene chloride at a 0.4 grams/dL concentration at 19° C. following an automated method based on ASTM D 5225-92.

Tensile testing was carried out at 70° F. (21° C.), relative humidity 65%, on an Instron type tensile tester. Yarn samples were twisted 3 turns per inch and were tested at a crosshead speed of 3.6 inches/minute at a gauge length of 6 inches. Five samples were run for each item tested.

Bulk level is expressed as a "bulk unit". The value is measured on the thread line by the method found in U.S. Pat. No. 5,084,823 (incorporated herein by reference) which is homogenous with the result obtained from a off-line method of measuring yarn shrinkage and crimp development disclosed in U.S. Pat. No. 4,295,252 (which is incorporated herein by reference).

EXAMPLES

The following examples are presented to demonstrate the invention, but are not intended to be limiting. Therein, unless otherwise indicated, all percentages, parts, etc. are by weight.

Example 1

Polytrimethylene terephthalate polymer chips having an intrinsic viscosity of 1.03 dl/g were loaded into the dryer and dried with dehumidified nitrogen at 160° C. for 6 hours to a moisture level of less than 50 ppm.

Colored pigmented chips comprising polytrimethylene terephthalate and color pigment in the concentrations described below were prepared by a two step process. A pigment dispersion was prepared first by combining a color pigment with toluene and a dispersing agent, a low molecular weight polycaprolactone with an attached carbamate moiety, followed by a milling operation. Polytrimethylene terephthalate was added to the front end of a devolatilizing twin-screw extruder and melted. The pigment dispersion was then added and thoroughly mixed with the polytrimethylene terephthalate. The solvent was removed though vacuum ports and the now pigmented polytrimethylene terephthalate extruded, cooled and cut into chips.

The dried polytrimethylene terephthalate chips and the colored pigmented chips were fed into the remelter, melted at 262° C. and discharged into a transfer line pump. Four individual pigment supply vessels were used to meter colored pigmented chips in a polytrimethylene terephthalate carrier at the rates shown below to obtain a green final color in the yarn.

| Color | Concentration, %[1] | Use Rate (lbs./hr.) |
|---|---|---|
| Black[2] | 5 | 4.5 |
| White[3] | 40 | 2.2 |
| Blue[4] | 5 | 1.3 |
| Yellow[5] | 10 | 1.6 |

[1]By weight of the colored pigmented chips.
[2]Pigment Black 7.
[3]Pigment White 6.
[4]Pigment Blue 15:1.
[5]Soluble Yellow 127.

The melted polymer was pumped to each spinning position meter pump at a rate of 79 pounds/hour (35.8 kg/hour) per spinning position. The polymer was spun through a 128 hole spinneret with two filament arrays, each of 64 filaments having a four hole hollow filament cross section. The polymer temperature before the spin pack was controlled at 260° C. The filaments were extruded from the spinneret die at a temperature that averaged 260° C. The molten filaments were then quenched by cross flow air in the quench cell at a temperature of 16° C. at 400 scfm (standard feet$^3$/min) (11.3 m$^3$/min). In the quench cell 2 undrawn antistatic Nylon/carbon (sheath/core) filaments were inserted into the cooled filaments for antistatic protection.

The filaments were pulled out of the quench cell by a heated metering roll set at 50° C. and a surface speed of 838 yards/minute (766 m/minute). Before the cooled yarn now at 59° C. reached the metering roll it passes a finish applicator to apply lubrication for drawing, bulking and processing on the customer equipment. Just after the oil was applied, the filaments passed through an air intermingling jet set at 10 pounds/inch$^2$ (6.9×10$^4$ Newton/m$^2$) gauge (psig) to fully and evenly distribute the oil over the filaments.

After the filaments left the metering roll, they passed over two heated drawpins set at 150° C. The filaments were pulled by the draw rolls and were fully drawn before going onto the draw rolls running at a surface speed of 3,015 yards/minute (2,757 m/min). The resultant draw ratio was 3.6. The heated draw rolls were set at 182° C. The filaments were annealed in the heated draw roll enclosure and then forwarded to the dual impingement bulking jet being supplied by air at 205° C. and at 110 psig (7.6×10$^5$ Newton/m$^2$) air. The bulking jet was similar to that described in Coon, U.S. Pat. No. 3,525,134, which is incorporated herein by reference. This bulking action formed two 1245 denier, 19 denier per filament bulked continuous filament yarns. The yarns were deposited on a rotating perforated drum screen for cooling at a zero tension state and then removed by a take-up roll at 2361 yards/minute and to a windup running at 2355 yards/minute.

The green pigmented yarns had a tenacity=2.46 grams/denier, elongation=49.6%, modulus @ 10%=10.00 grams/denier, bulk level=49.9 and an intrinsic viscosity of 0.93.

Example 2 Comparative

Polytrimethylene terephthalate polymer chips as described in Example 1 were dried as in Example 1 and fed to a remelter and discharged into a transfer line pump as in Example 1. A pigment supply vessel was used to meter TiO$_2$ colored pigmented chips in a polytrimethylene terephthalate carrier at the transfer line pump, to obtain an uncolored yarn containing 0.2 weight % TiO$_2$.

The melted polymer was used to prepared yarn as in Example 1, with the following differences: the yarn cooled to 62° C. before it reached the metering roll, the air intermingling jet was set at 20 psig ($1.4 \times 10^5$ Newton/m$^2$) the heated draw rolls were set at 175° C., and the dual impingement bulking jet was supplied by air at 195° C. and at 110 psig ($7.6 \times 10^5$ Newton/m$^2$) air.

The uncolored yarns had a tenacity=2.47 grams/denier, elongation=45.2%, modulus @ 10%=10.17 grams/denier, bulk level=46.7 and an intrinsic viscosity of 0.89.

Example 3

The drawing tensions of Examples 1 and 2 were taken and compared with drawing tension data from similar Nylon 6,6 products spun with the same additives:

|  | Polytrimethylene Terephthalate, gms* | Nylon 6,6, gms** |
|---|---|---|
| Green | 738 | ~1200 |
| Uncolored | 680 | ~700 |
| Delta | 58 | ~500 |

Where * indicates normalized for final yarn intrinsic viscosity difference and ** indicates nylon 6,6 values are nominal As shown by the examples, the impact of the color pigments in a polytrimethylene terephthalate carrier has a minimal impact on the draw tension resulting in no significant impact on manufacturing productivity.

Example 4

In order to compare pigmented polytrimethylene terephthalate BCF yarns with Lumena® yarns (made from nylon 6,6), a series of single-color, polytrimethylene terephthalate BCF yarns were prepared varying color pigment and pigment level. The color pigments were blended into the polytrimethylene terephthalate polymer following the procedure in Example 1. Dried polytrimethylene terephthalate polymer chips and the colored pigmented chips were remelted together and spun similar to Example 1. The spun yarns were evaluated for colorfastness to light (Xenon Arc—200 hrs), atmospheric contaminants (NO$_2$ and O$_3$), water bleed and crocking. The AATCC test methods and the standard AATCC gray scale value for Lumena® yarns is given in Table 1. The gray scale values for tested pigmented polytrimethylene terephthalate BCF yarns for each colorfastness test is given in Table 2 showing them to be equal or superior to the Lumena® standard. An additional, non-AATCC test for bleaching was also carried out on the pigmented polytrimethylene terephthalate yarns and compared to the standard for Lumena® yarns. Test specimens (knit sock) were submerged in a bleach solution (5.25% by weight sodium hypochlorite, 10 g/l sodium bisulfite, 7.5 mg/l Ultra Tide® detergent and distilled water) and held at 20° C. for 24 hours. The specimens were removed from the bleach solution, neutralized, washed, dried and graded according to the AATCC gray scale. The results are in Table 2 and are equivalent or superior to the Lumena® standards found in Table 1.

TABLE 1

|  | Test | Lumena |
|---|---|---|
| Colorfastness to Light - Xenon Arc | | |
| 200 hours | AATCC 16E | 3–4 |
| Colorfastness to Atmospheric Contaminants | | |
| NO$_2$ | AATCC 164 | 3–4 |
| O$_3$ | AATCC 129 | 3–4 |
| Colorfastness to Water - Bleed | AATCC 107 | 4 |
| Colorfastness - Crocking | | |
| Wet | AATCC8 | 4 |
| Dry | AATCC8 | 4 |
| Colorfastness to Bleach | | |
| 24 hrs. | | 3 |

TABLE 2

| Color | Pigment | PIY, % | O$_3$ | NO$_2$ | Xenon 200 hrs. | Bleed | Crocking Wet | Crocking Dry | Bleach 24 hrs. |
|---|---|---|---|---|---|---|---|---|---|
| Yellow | PBr24 | 1.0 | 5 | 4–5 | 5 | 5 | 5 | 5 | 4 |
| | | 0.5 | 4–5 | 4–5 | 4–5 | 5 | 5 | 5 | 4 |
| | | 0.2 | 4–5 | 4–5 | 4–5 | 5 | 5 | 5 | 4 |
| | | 0.1 | 4 | 4–5 | 4–5 | 5 | 5 | 5 | 4 |
| Magenta | PR202 | 0.4 | 4–5 | 5 | 4–5 | 4–5 | 5 | 5 | 4 |
| | | 0.2 | 4–5 | 4–5 | 4–5 | 5 | 5 | 5 | 4–5 |
| | | 0.1 | 4 | 5 | 4–5 | 5 | 5 | 5 | 4–5 |
| | | 0.05 | 4 | 5 | 4–5 | 5 | 5 | 5 | 4–5 |
| Black | PBK-7 | 0.4 | 4 | 4–5 | 4–5 | 4–5 | 5 | 5 | 4–5 |
| | | 0.2 | 4 | 4–5 | 4–5 | 4–5 | 5 | 5 | 4 |
| | | 0.1 | 4–5 | 4–5 | 4–5 | 4–5 | 5 | 5 | 4 |
| | | 0.05 | 4 | 4–5 | 4–5 | 4–5 | 5 | 5 | 4 |
| Blue | PB15:1 | 0.4 | 4 | 5 | 5 | 4–5 | 4–5 | 4 | 4–5 |
| | | 0.2 | 4–5 | 5 | 4–5 | 5 | 4 | 4 | 4 |
| | | 0.1 | 5 | 4–5 | 5 | 4–5 | 4–5 | 4 | 4–5 |
| | | 0.05 | 5 | 4–5 | 5 | 4–5 | 4–5 | 4–5 | 4–5 |
| Yellow | SY-21 | 0.4 | 4–5 | 5 | 4–5 | 3 | 2–3 | 3 | 5 |
| | | 0.2 | 4–5 | 5 | 4 | 3–4 | 3–4 | 4 | 4–5 |

TABLE 2-continued

| Color | Pigment | PIY, % | O₃ | NO₂ | Xenon 200 hrs. | Bleed | Crocking Wet | Dry | Bleach 24 hrs. |
|---|---|---|---|---|---|---|---|---|---|
| | | 0.1 | 4–5 | 4–5 | 4 | 4 | 4 | 4–5 | 4–5 |
| | | 0.05 | 4–5 | 5 | 4–5 | 5 | 4–5 | 4–5 | 4 |
| Yellow | PY-147 | 0.8 | 4–5 | 4–5 | 4 | 4 | 2–3 | 3 | 4–5 |
| | | 0.4 | 4–5 | 4–5 | 4 | 4 | 3 | 2–3 | 4–5 |
| | | 0.2 | 4–5 | 4–5 | 4 | 4–5 | 3–4 | 4 | 4–5 |
| | | 0.1 | 4–5 | 4–5 | 4 | 5 | 4–5 | 4–5 | 4 |
| | | 0.05 | 5 | 5 | 4 | 5 | 5 | 5 | 4–5 |
| Yellow | PY-184 | 0.8 | 4–5 | 4–5 | 4 | 4–5 | 5 | 5 | 4–5 |
| | | 0.4 | 5 | 4–5 | 4–5 | 5 | 5 | 5 | 4 |
| | | 0.2 | 4–5 | 4–5 | 4 | 5 | 5 | 5 | 4 |
| | | 0.1 | 4–5 | 5 | 4–5 | 4–5 | 5 | 5 | 4–5 |
| Orange | PO-68 | 0.4 | 5 | 4–5 | 4 | 5 | 4 | 4 | 4–5 |
| | | 0.2 | 4–5 | 4–5 | 4–5 | 4–5 | 4–5 | 4–5 | 4 |
| | | 0.1 | 5 | 4–5 | 4 | 5 | 4–5 | 4–5 | 4–5 |
| | | 0.05 | 4–5 | 4–5 | 4 | 4–5 | 4–5 | 4–5 | 4–5 |
| Green | PG-7 | 0.4 | 5 | 4–5 | 4 | 4–5 | 4–5 | 4–5 | 4–5 |
| | | 0.2 | 4–5 | 4–5 | 4–5 | 4–5 | 5 | 4–5 | 4–5 |
| | | 0.1 | 4–5 | 4–5 | 4 | 4–5 | 5 | 5 | 4 |
| | | 0.05 | 4–5 | 4–5 | 4 | 4–5 | 5 | 4–5 | 4–5 |
| Maroon | PR-179 | 0.4 | 4–5 | 4–5 | 4–5 | 4–5 | 4 | 4 | 4–5 |
| | | 0.3 | 4–5 | 4–5 | 4–5 | 4–5 | 4 | 4 | 4–5 |
| | | 0.2 | 4–5 | 4–5 | 4 | 4–5 | 4 | 4 | 4 |
| | | 0.1 | 3–4 | 4 | 3–4 | 4–5 | 2–3 | 3 | 4–5 |
| Black | PBK-6 | 0.4 | 4 | 4 | 4 | 4–5 | 4–5 | — | 4 |
| | | 0.2 | 4–5 | 4 | 4 | 4–5 | 4–5 | — | 4 |
| | | 0.1 | 4–5 | 4 | 4 | 4–5 | 4–5 | — | 4 |
| | | 0.05 | 4–5 | 4–5 | 4–5 | 5 | 5 | — | 4 |
| Red | PR101-YS | 0.2 | 4 | 4 | 3–4 | 4–5 | 5 | 5 | 4–5 |
| | | 0.8 | 4 | 3–4 | 3 | 4 | 5 | 5 | 4 |
| Violet | PV29 | 0.4 | 4–5 | 5 | 4–5 | — | 4–5 | 4–5 | — |
| | | 0.1 | 4–5 | 5 | 4–5 | — | 4–5 | 4–5 | — |
| | | 0.05 | 5 | 4–5 | 4–5 | — | 5 | 5 | — |

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A process of making a pigmented shaped article comprising:
   (a) providing polytrimethylene terephthalate chips and two or more colored pigmented chips each containing at least one different color pigment, wherein the colored pigmented chips comprise about 30–about 99.9 weight % polytrimethylene terephthalate and about 0.1–about 70 weight % color pigment, both by weight of the colored pigmented chips;
   (b) heating the polytrimethylene terephthalate chips and colored pigmented chips to a temperature of about 200–about 280° C. to melt the chips and form a polymer composition comprising the polytrimethylene terephthalate and the color pigments; and
   (c) forming a shaped article from the polymer composition.

2. The process of claim 1 wherein the chips are heated to about 245–about 270° C.

3. The process of claim 1 wherein the forming is carried out using a spinneret at a polymer temperature of about 235–about 275° C.

4. The process of claim 1 wherein the colored pigmented chips comprise polytrimethylene terephthalate and at least one color pigment.

5. The process of claim 1 wherein at least some of the polytrimethylene terephthalate chips contain TiO₂.

6. The process of claim 1 wherein at least some of the colored pigmented chips contain TiO₂.

7. The process of claim 4 wherein the colored pigmented chips do not contain TiO₂.

8. The process of claim 4 wherein the color pigment is a color pigment other than carbon black.

9. The process of claim 7 wherein the color pigment is a color pigment other than carbon black.

10. The process of claim 1 wherein the polytrimethylene terephthalate chips and polytrimethylene terephthalate pigmented chips are fed to a remelter, melted and mixed in the remelter and formed into a shaped article through an extruder.

11. The process of claim 10, wherein the polytrimethylene terephthalate and the color pigment form a substantially uniform melt in the remelter.

12. The process of claim 1 wherein the forming a shaped article comprises extruding the polymer composition through a spinneret so as to form fibers.

13. The process of claim 12 wherein the fibers are formed into a yarn.

14. The process of claim 13 wherein the yarn is a bulked continuous filament yarn.

15. The process of claim 1 wherein the polytrimethylene terephthalate chips comprise at least 70 weight % or more, by weight of the polytrimethylene terephthalate chips, of polytrimethylene terephthalate.

16. The process of claim 1 wherein the colored pigmented chips consist essentially of (a) about 30–about 99.9 weight % polytrimethylene terephthalate(s), (b) about 0.1–about 70 weight % color pigment(s), (c) optionally TiO₂, and (d) optionally one or more chip additive.

17. The process of claim 1 wherein at least two of the two or more colored pigmented chips are fed from separate containers.

18. The process of claim 1 wherein the shaped article is a monocomponent filament.

19. The process of claim 1 wherein the shaped article is a staple fiber.

20. The process of claim 1 wherein the shaped article is a bicomponent fiber comprising polytrimethylene terephthalate in at least one component.

21. The process of claim 1 wherein the shaped article is a film or a layer of a film.

* * * * *